(12) United States Patent
Wirsch, Jr. et al.

(10) Patent No.: US 9,621,011 B2
(45) Date of Patent: Apr. 11, 2017

(54) STATOR ASSEMBLY

(71) Applicant: GE Aviation Systems LLC, Grand Rapids, MI (US)

(72) Inventors: Paul James Wirsch, Jr., Springboro, OH (US); Winfred Dwight Koontz, Jr., Brookville, OH (US); James Patrick Mahle, Vandalia, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 500 days.

(21) Appl. No.: 14/193,776

(22) Filed: Feb. 28, 2014

(65) Prior Publication Data

US 2015/0249379 A1 Sep. 3, 2015

(51) Int. Cl.
| | |
|---|---|
| *H02K 9/197* | (2006.01) |
| *H02K 3/24* | (2006.01) |
| *H02K 9/19* | (2006.01) |
| *H02K 5/20* | (2006.01) |

(52) U.S. Cl.
CPC ............... *H02K 9/19* (2013.01); *H02K 5/20* (2013.01)

(58) Field of Classification Search
CPC .. H02K 3/24; H02K 5/20; H02K 9/19; H02K 9/197
USPC ............................................. 310/54, 52, 58
See application file for complete search history.

(56) References Cited

U.S. PATENT DOCUMENTS

| | | | | |
|---|---|---|---|---|
| 5,762,471 | A * | 6/1998 | Cunha .................... | F01D 5/189 415/115 |
| 6,204,580 | B1 * | 3/2001 | Kazmierczak .......... | H02K 3/24 310/216.119 |
| 8,500,405 | B1 | 8/2013 | Jones et al. | |
| 2012/0091838 | A1 * | 4/2012 | Miyamoto ............... | H02K 9/19 310/54 |
| 2012/0318479 | A1 * | 12/2012 | Chang .................... | F28F 13/06 165/104.19 |
| 2013/0154266 | A1 * | 6/2013 | Ono ........................ | H02K 1/185 290/52 |
| 2013/0207395 | A1 * | 8/2013 | Huang .................... | H02K 9/19 290/46 |
| 2013/0234545 | A1 * | 9/2013 | Pal ........................... | H02K 1/20 310/59 |

FOREIGN PATENT DOCUMENTS

EP 0869260 A2 7/1998

* cited by examiner

*Primary Examiner* — Alex W Mok
(74) *Attorney, Agent, or Firm* — GE Global Patent Operation; William S. Munnerlyn

(57) ABSTRACT

An electric machine, such as a generator, providing for the generation of electricity and includes a rotor generating a magnetic field and a stator having stator windings. The interaction of the magnetic field with the stator windings generates current in the windings. The generator may provide the generated current to a power output of the generator, where it may be further transmitted to an electrical load to power the load.

20 Claims, 6 Drawing Sheets

STATOR ASSEMBLY

BACKGROUND OF THE INVENTION

Electric machines, such as generators, provide for the generation of electricity from a mechanical force. The generation of the electricity occurs due to the interaction of a rotating magnetic field in relation to a set of conductive windings. In one generator example, a rotor rotated by a mechanical force may generate the rotating magnetic field relative to a stationary stator having a set of conductive windings. The interaction generates a current in the stator windings, which may be provided to the power output of the generator, where it may be further transmitted to power an electrical load.

BRIEF DESCRIPTION OF THE INVENTION

In one aspect, a stator assembly for an electric machine includes a stator core having multiple posts, multiple windings, with a winding provided on each of the posts and a stator sleeve located about the stator core and an inner surface confronting the windings. The stator sleeve includes a convection reservoir extending along and in a thermally conductive confronting relationship with at least a portion of the windings, a delivery reservoir extending along at least a portion of the length of the convection reservoir, and a plurality of transfer ports fluidly coupling the convection reservoir with the delivery reservoir. The convection reservoir is located between the delivery reservoir and the inner surface, and the delivery reservoir has an inlet and the convection reservoir has an outlet to define a coolant flow path, whereby coolant can be provided to the inlet where it flows through the delivery reservoir, through the plurality of transfer ports to the convection reservoir, and out the outlet.

DESCRIPTION OF EMBODIMENTS OF THE INVENTION

The invention may be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations may be included in the machine. While this description is primarily directed toward an electric machine providing power generation, it is also applicable to an electric machine providing a driving force and/or an electric machine providing both a driving force and power generation. Further, the invention is applicable in any environment using an electric machine.

Figure 1:
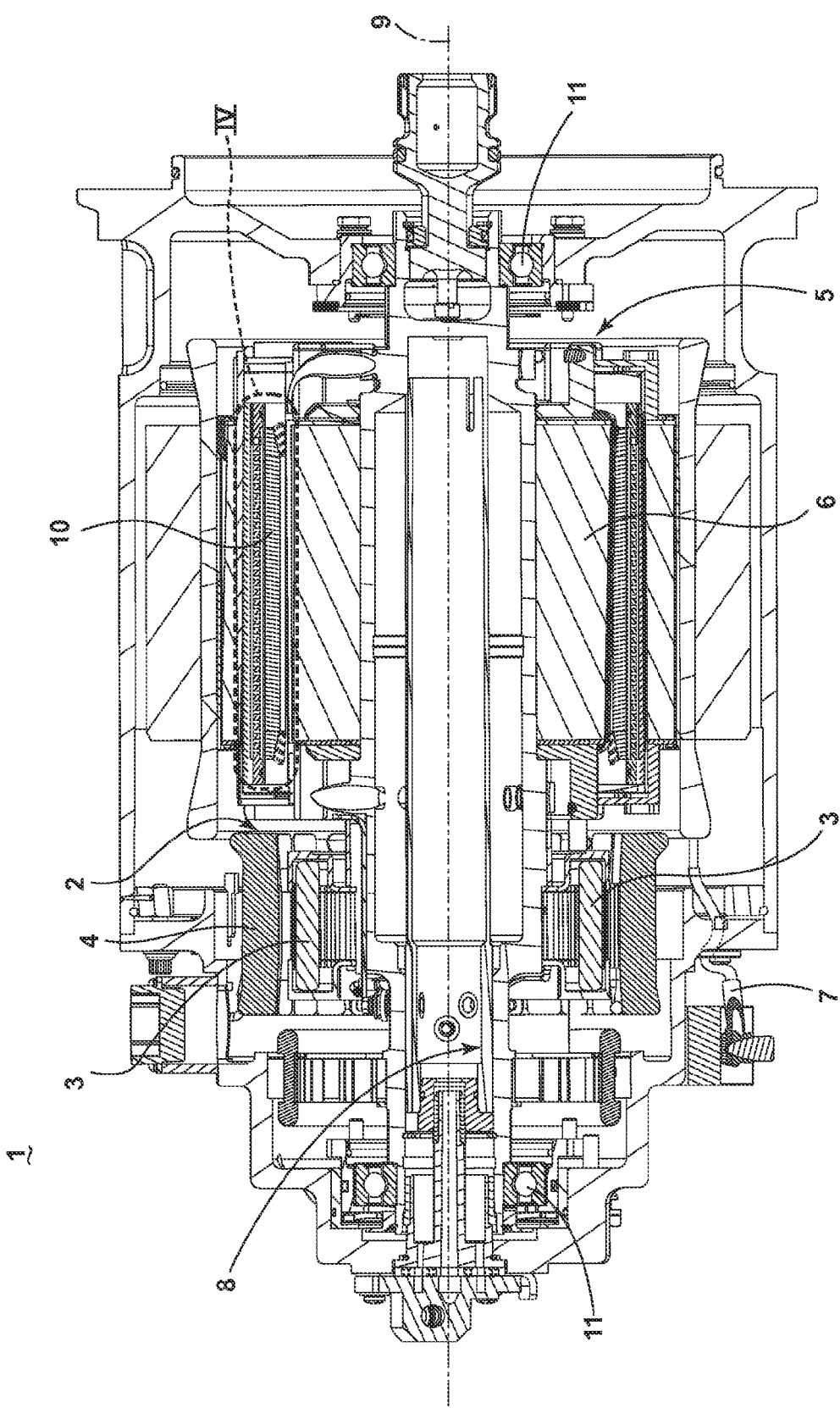
FIG. 1 is a sectional view of an electrical machine assembly.

FIG. 1 illustrates an electric machine assembly, such as a generator 1, comprising a first machine 2 having an exciter rotor 3 and an exciter stator 4, and a synchronous second machine 5 having a main machine rotor 6 and a main machine stator assembly 10. At least one power connection is provided on the exterior of the generator 1 to provide for the transfer of electrical power to and from the generator 1. Power is transmitted by this power connection, shown as an electrical power cable 7, directly or indirectly, to the electrical load and may provide for a three phase with a ground reference output from the generator 1.

The generator 1 further comprises a rotatable shaft 8 mechanically coupled to a source of axial rotation, which may be a gas turbine engine, about an axis of rotation 9. The rotatable shaft 8 is supported by spaced bearings 11. The exciter rotor 3 and main machine rotor 6 are mounted to the rotatable shaft 8 for rotation relative to the stators 4, 10, which are rotationally fixed within the generator 1. The stators 4, 10 may be mounted to any suitable part of a housing portion of the generator 1. The rotatable shaft 8 is configured such that mechanical force from a running turbine engine provides rotation to the shaft 8. Alternatively, in the example of a starter/generator, rotation of the rotatable shaft 8 of the generator 1 during a starting mode produces a mechanical force that is transferred through the shaft 8 to provide rotation to the turbine engine.

Figure 2:
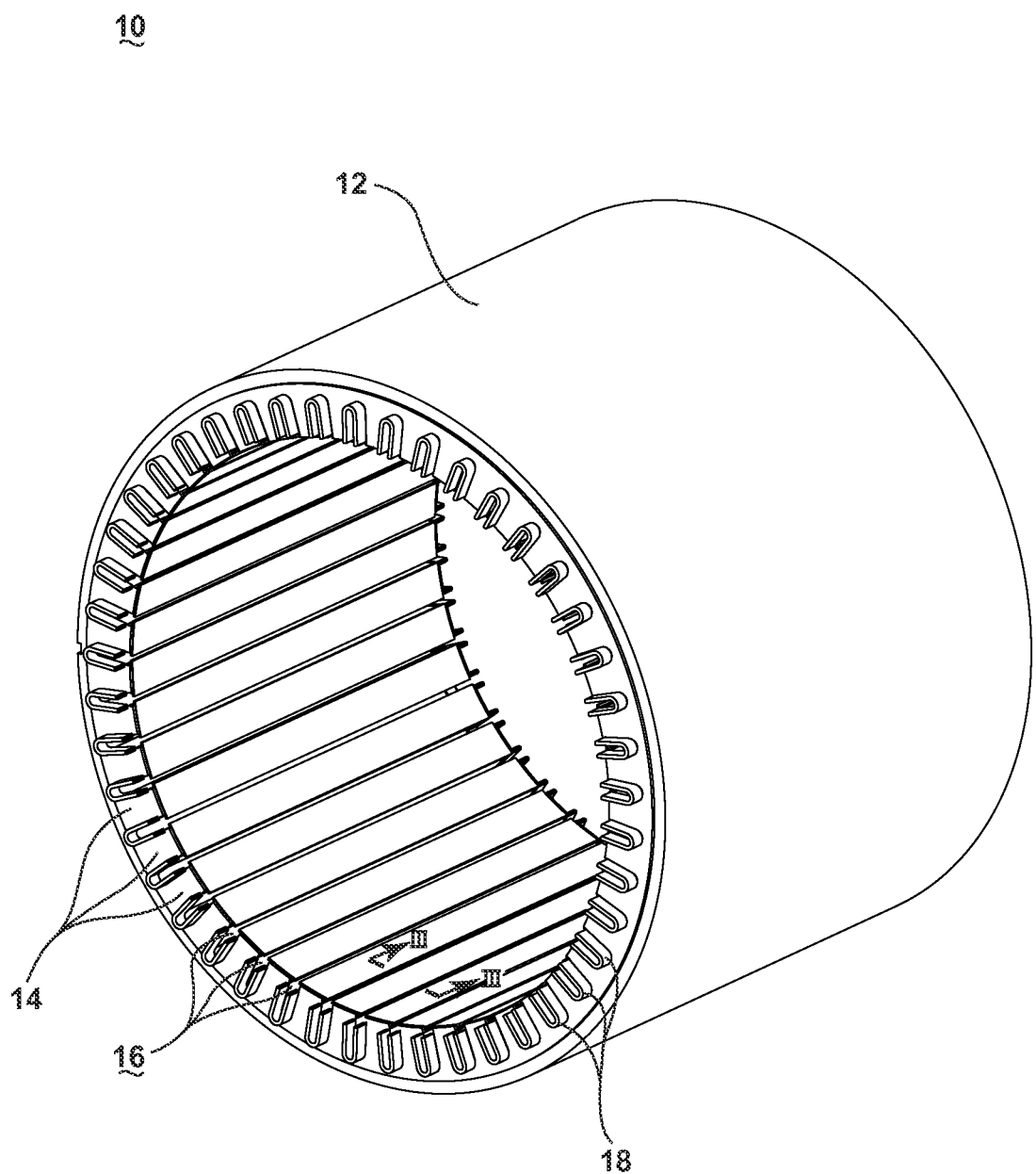
FIG. 2 is a perspective view illustrating a stator assembly of an electric machine according to the first embodiment of the invention.

FIG. 2 illustrates the stator assembly 10 in greater detail. The stator assembly 10, as shown, comprises a generally cylindrical core 12, a plurality of posts 14, at least one winding slot 16, and may optionally include at least one slot liner 18 provided for at least some of the winding slots 16. The surface at the inner perimeter of the core 12 faces the rotor 6 and has a plurality of spaced posts 14 defining a corresponding plurality of spaced winding slots 16 therebetween, radially arranged at a predetermined spacing in the circumferential direction. Each of the plurality of winding slots 16 are configured with an open top facing the circumferential center point of the core 12 and may terminate in opposing open ends spaced axially along the core 12. For instance, the ends of the winding slot 16 may axially terminate at the same length as the core 12. A slot liner 18 is placed along the inner perimeter of the winding slot 16 defining an open top facing the circumferential center point of the core 12 and terminating in opposing ends which are shown extending beyond the winding slot 16 open ends. Alternatively, the slot liner 18 terminating ends may not extend beyond the winding slot 16 open ends. The core 12 may be formed from a plurality of laminations, but alternate forming or machining of materials is envisioned.

Figure 3:
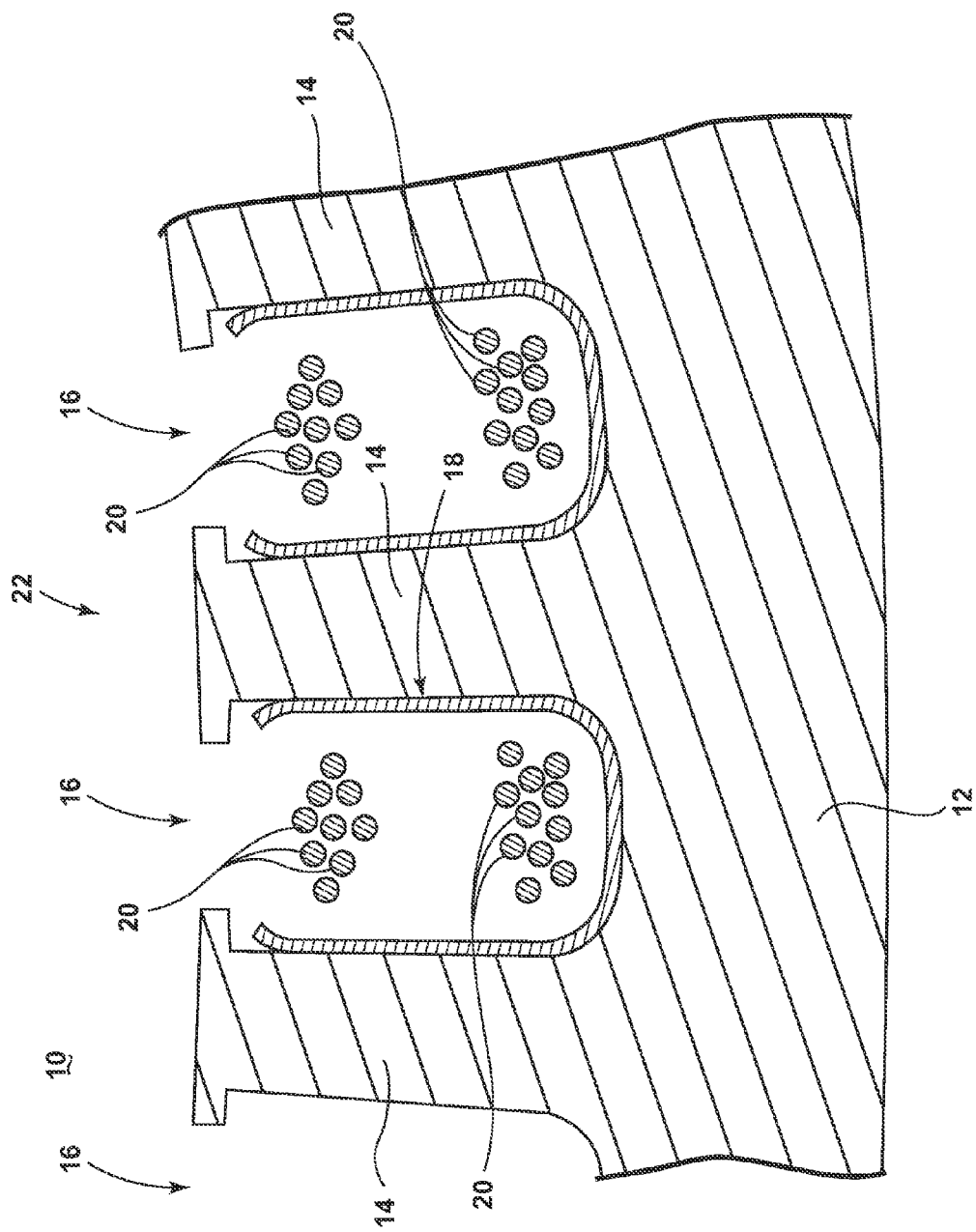
FIG. 3 is a partial sectional view taken along line III-III of FIG. 2 showing a winding slot and slot liner according to the first embodiment of the invention.

FIG. 3 illustrates a sectional view of a configuration of a single winding slot 16 assembled stator assembly 10 having stator windings 20 according to one embodiment of the invention. The stator windings 20 comprise conductive wires (only a few are shown, not to scale, for illustrative purposes) that are wound about the core 12 within the winding slot 16 such that individual sets of windings 20 may be separated from other sets of windings 20 found in adjacent slots 16. Additionally shown, the slot liner 18 isolates the plurality of stator windings 20 from the plurality of posts 14 and the stator core 12. While only one set of stator windings 20 are shown, it is envisioned that at least one set of windings 20 is wound around the axial ends of at least two posts 14 (henceforth, "end turns") and through at least two adjacent winding slots 16 such that the energization of the windings 20 form a magnetic pole 22 at the intervening post 14. The rotation of a magnetic field at the rotor 6 generates a corresponding voltage in the stator windings 20 at the corresponding poles 22.

Figure 4:
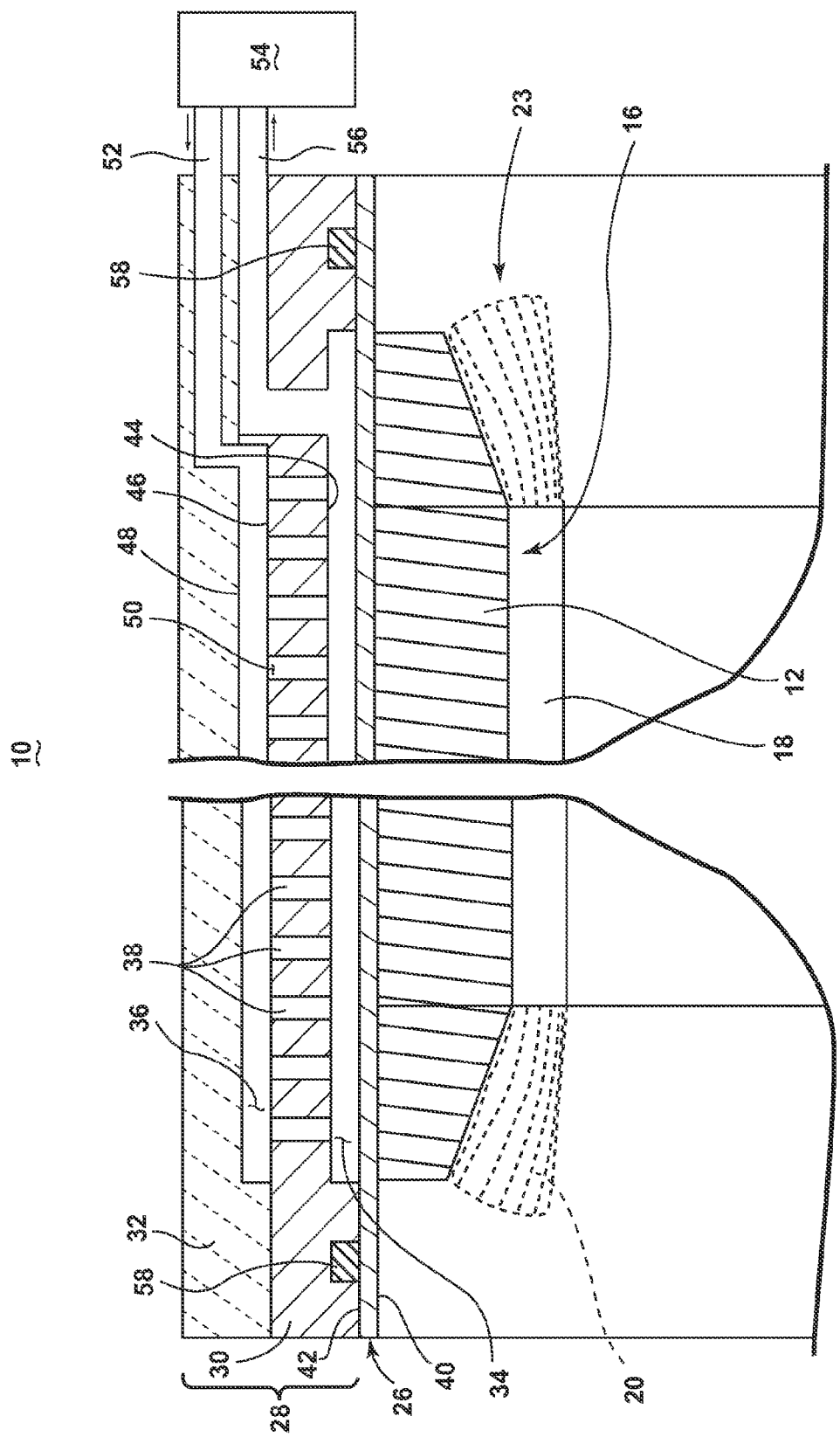
FIG. 4 is an enlarged partial sectional view of the area labeled IV of the electric machine assembly of FIG. 1, showing the stator assembly according to the first embodiment of the invention.

FIG. 4 illustrates an enlarged partial sectional view of the area labeled IV of the electric machine assembly of FIG. 1, showing the stator assembly 10. As shown, at least a portion of the stator windings 20 define end turns 23 axially extending outside the core 12 and slot liner 18 as they wind about the poles 22. It is envisioned that the stator windings 20 and/or end turns 23 are in physical and/or conductive contact with the stator core 12. Also shown, the stator assembly 10 may include a first thermally conductive stator sleeve 26, such as a steel sleeve, configured in a ring to encircle the stator core 12, and a second stator sleeve 28 also configured in a ring and located about the stator core 12, and overlaying the thermally conductive sleeve 26. As shown, the second stator sleeve 28 may further comprise overlaying sleeves, such as an inner stator sleeve 30 and an outer stator sleeve 32, a convection reservoir 34, a delivery reservoir 36, and a plurality of transfer ports 38.

As illustrated, the thermally conductive sleeve 26 may define an inner surface 40 confronting the stator core 12 and stator windings 20, and a second surface 42, spaced from the inner surface 40, confronting the inner sleeve 30 and defining at least a portion of a convection reservoir 34. The inner sleeve 30 may be radially defined by a third surface 44 and a fourth surface 46 (spaced from the third surface 44), wherein the third surface 44 confronts the second surface 42 and defines at least another portion of the convection reservoir 34, and wherein the fourth surface 46 confronts the outer sleeve 32 and defines at least a portion of the delivery reservoir 36. The outer sleeve 32 may be radially defined by at least a fifth surface 48 confronting the fourth surface 46 and defining at least a portion of the delivery reservoir 36.

The convection reservoir 34 is shown extending along and in a thermally conductive confronting relationship with at least a portion of the stator windings 20, and the delivery reservoir 36 is shown extending along at least a portion of the convection reservoir 34. In this sense, the convection reservoir 34 is in a thermally conductive relationship with at least one of the stator core 12, the stator windings 20, and/or the thermally conductive sleeve 26, while, for example, any fluid traversing the convection reservoir 34 will be in a convective relationship with the convection reservoir 34. While the illustrated embodiment shows each of the convection reservoir 34, delivery reservoir 36, and stator core 12 extending along a similar length, alternative embodiments are envisioned wherein each of the lengths are dissimilar.

The plurality of transfer ports 38 define holes extending radially through the inner sleeve 30, and are arranged along the axial length between the convection reservoir 34 and delivery reservoir 36. It is additionally envisioned that the transfer ports 38 may fluidly couple the convection reservoir 34 with the delivery reservoir 36. In this sense, the plurality of transfer ports 38 may be at least partially defined by openings 50 in the respective third and fourth surfaces 44, 46. It is envisioned that the transfer ports 38 may be configured for particularly defined fluid traversal. For example, at least one of the transfer ports 38 may further comprise an impingement port that, for example, is configured such that fluid traversing the port is pressurized to be delivered at a high velocity.

The delivery reservoir 36 may further comprise an inlet port 52 fluidly coupled to a fluid source, for example, a coolant pump 54, and the convection reservoir 34 may further comprise an outlet port 56 fluidly coupled to, for instance the coolant pump 54. In this sense, the inlet port 52, delivery reservoir 36, plurality of transfer ports 38, convection reservoir 34, and outlet port 54 collectively define a flow path for fluid, for example, coolant. In this example, the coolant pump 54 may provide coolant to the inlet port 52, which is returned for recirculation via the outlet port 56. It is envisioned the stator assembly 10 may further provide additional components, for example, o-rings 58, to prevent fluid leaks along the fluid flow path. Embodiments of the invention are envisioned wherein the cumulative cross-sectional area of the transfer port openings 50 relative to the cross-section area of the delivery reservoir 36 confronting the transfer port openings 50 is configured or selected such that the delivery reservoir 36, subject to a given supply rate of coolant by the coolant pump 54, is operably capable of distributing the coolant to all of the transfer ports 38. That is, the rate of liquid into the delivery reservoir 36 is great enough that the liquid will not flow through just some of the transfer ports, but will provide for the liquid to spread throughout the delivery reservoir 36 and supply all of the transfer ports 38.

During operation of the generator 1, the interaction of the rotating magnetic field with the stator windings 20 of the stator assembly 10 generates a current through the windings 20, which may ultimately be delivered to a generator output or electrical load for operating the load. The current generated in the stator windings 20 generates heat in the windings 20. The physical and/or thermal contact between the stator windings 20 and the stator core 12 allows the heat generated in the windings 20 to be thermally conducted to the core 12, where it may be further conducted, through the thermally conductive sleeve 26, to the convection reservoir 34. The coolant pump 54 may simultaneously provide pressurized coolant along the coolant flow path, such that coolant may traverse into the delivery reservoir 36, through the plurality of transfer ports 38, and into the convection reservoir 34. The coolant absorbs the heat in the convection reservoir 34 via convection, and continues to traverse the coolant flow path, where the heat may be further dissipated, for example, via heat fins or air cooling.

Embodiments of the invention are envisioned wherein particular cooling methods may be further included. For example, in embodiments wherein the transfer ports 38 may comprise impingement ports, the impingement ports may be configured such that the delivery reservoir 36, subject to a given supply rate of coolant by the coolant pump 54, is operably capable of delivering coolant through each impingement port at a high velocity. In this example, the coolant delivered at a high velocity makes contact with the second surface 42 of the convection reservoir 34 such that it generates a thin boundary layer of coolant at a portion the second surface 42, located relative to the impingement port, and due to the thin boundary layer, may provide a higher heat transfer, via convection, between the second surface 42 and the coolant than by using conventional conduction alone. This configuration provides for a particular type of cooling, referred to as "impingement cooling."

Figure 5:
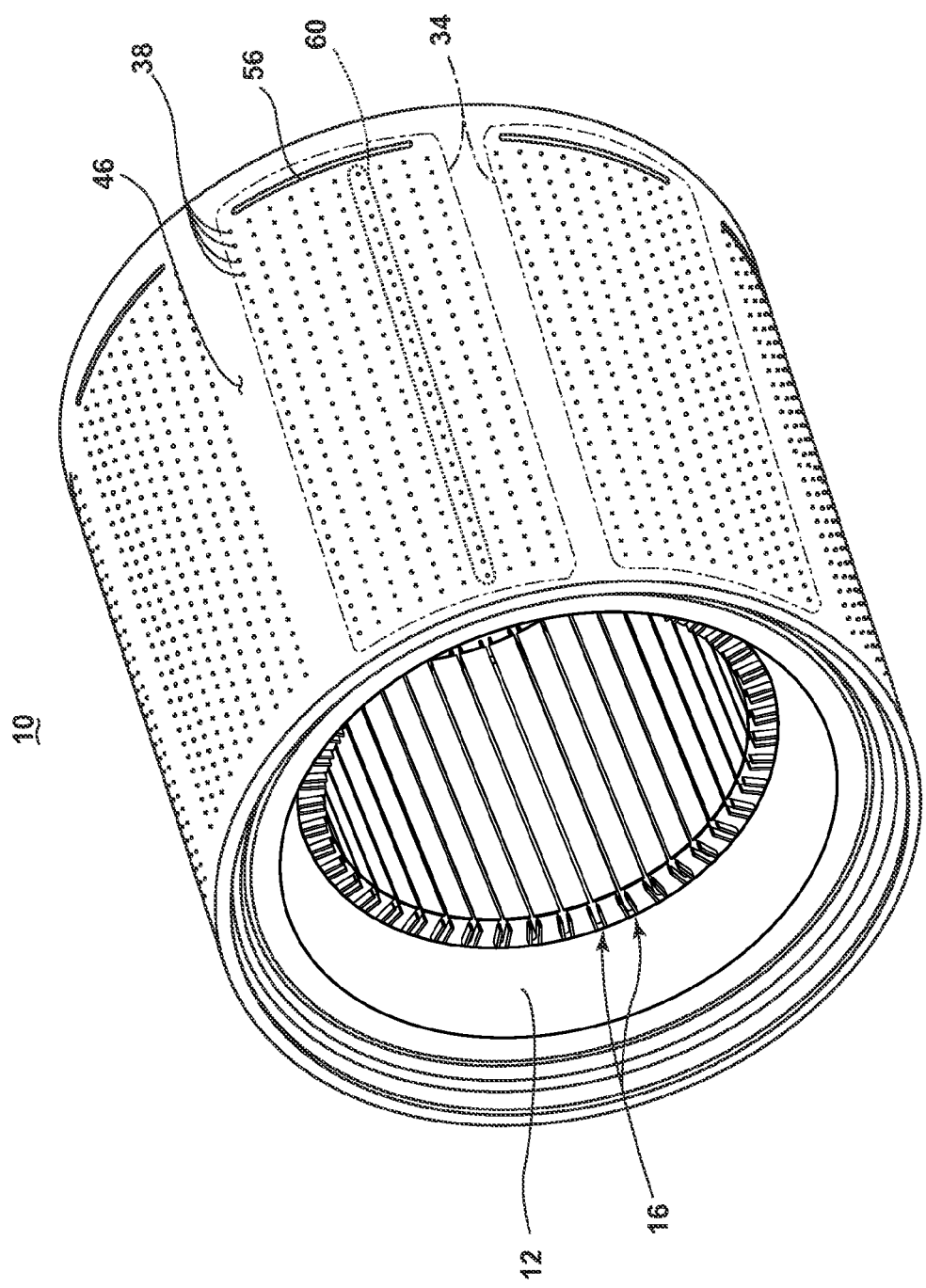
FIG. 5 is a perspective view illustrating the transfer port hole pattern along the stator assembly according to the first embodiment of the invention.

FIG. 5 illustrates a first embodiment of a pattern of transfer ports 38 along the axial length of the stator assembly 10, wherein the outer sleeve 32 has been removed for viewing purposes. As shown, the configuration of the transfer ports 38 may define at least one row of transfer ports 60, extending axially along the length of the stator assembly 10. Additionally, one or more rows of transfer ports 60 may correspond to a single convection reservoir 34 (illustrated by dotted line) and outlet port 56. Alternatively, a row of transfer ports 60 may correspond to a convection reservoir 34 that serves only that single row of transfer ports 60. Furthermore, a row of transfer ports 60 may be supplied with coolant by a delivery reservoir 36 that serves only that row 60, or by a delivery reservoir 36 that serves more than one row 60. For example, embodiments of the invention are envisioned wherein the delivery reservoir 36, row of transfer ports 60, and convection reservoir 34 are in a 1:1:1 relationship. Alternatively, embodiments of the invention are envisioned having any permutation of a one to at least one relationship of delivery reservoir 36 to rows 60, and one to at least one relationship of convection reservoir 34 to rows 60, wherein, for example, the delivery reservoirs 36 may not radially align with the convection reservoir 34. Additionally, embodiments of the invention are envisioned wherein individual transfer ports 38 of a row of transfer ports 60 may be supplied from, or provide coolant to, one or more delivery reservoirs 36 and/or convection reservoirs 34. Furthermore the rows of transfer ports 60 may be configured or positioned to align relative to the axial length of the stator windings 20, which may further provide for efficient thermally conductive relationships between the convection reservoirs 34 and windings 20.

Figure 6:
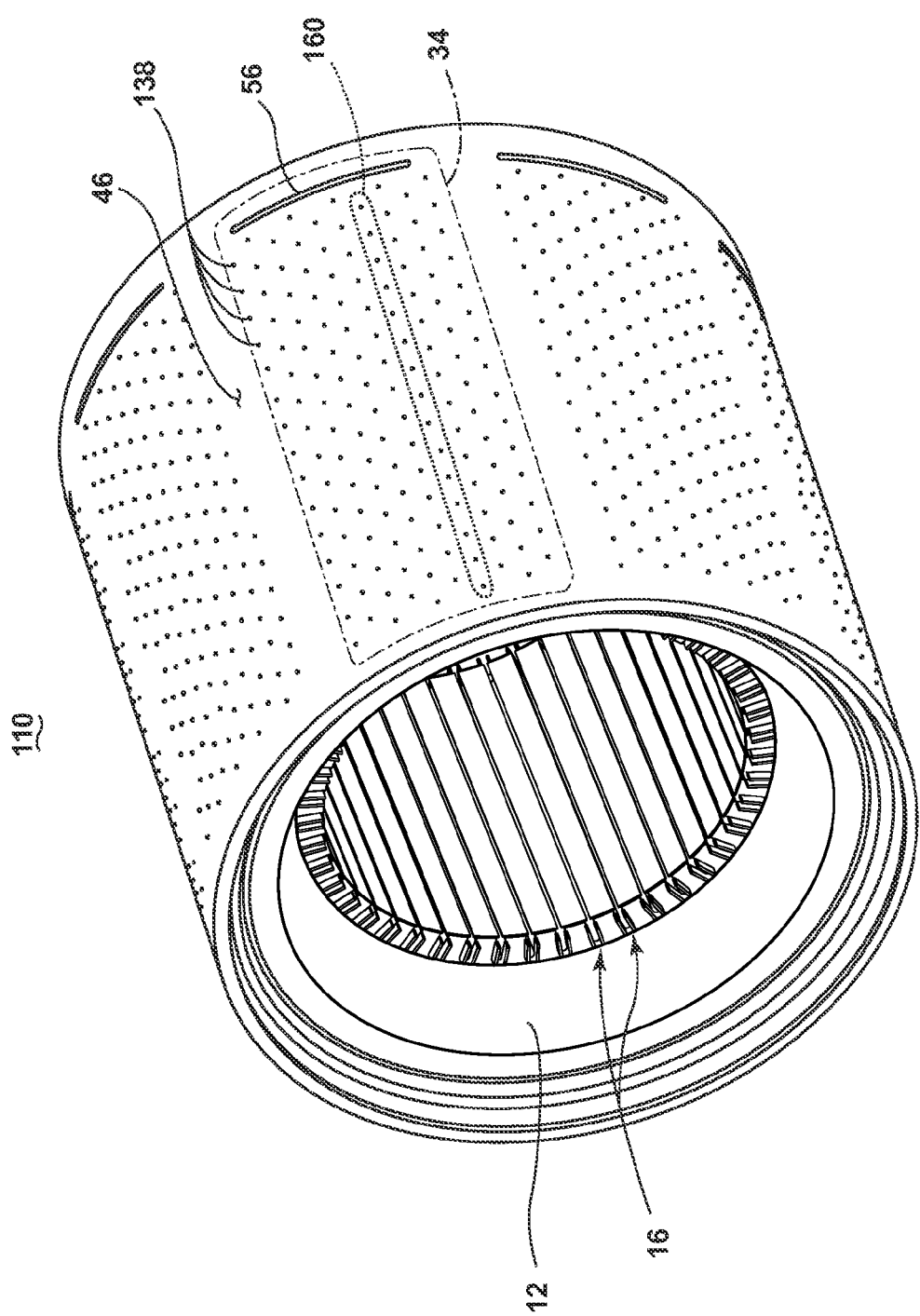
FIG. 6 is a perspective view illustrating an alternative transfer port hole pattern along the stator assembly according to the second embodiment of the invention.

FIG. 6 illustrates an alternative stator assembly 110 design according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the transfer ports 138 are arranged such that transfer ports 138 of adjacent rows of transfer ports 160 are staggered along the length of the stator assembly 110.

Many other possible embodiments and configurations in addition to that shown in the above figures are contemplated by the present disclosure. For example, one embodiment of the invention contemplates removing the thermally conductive sleeve 26, and allowing coolant to contact the stator core 12 directly. Additionally, the design and placement of the various components may be rearranged such that a number of different in-line configurations could be realized.

The embodiments disclosed herein provide a stator assembly with improved heat dissipation. One advantage that may be realized in the above embodiments is that the above described embodiments have superior thermal and electrical operation over the conventional stator assembly configurations. With the proposed configurations, a high thermal transfer between the stator windings and coolant can be achieved due to the improved distribution of the coolant along the length of the stator as described above. Additionally, distribution of the coolant, for example, via impingement cooling, provides for better convective cooling than in conventional designs, allowing even more heat to be removed from the stator windings.

The higher thermal transfer allows for a generator that can dissipate higher levels of heat. Since the amount of heat generated in the stator windings is related to the amount of electricity generated, the above-described embodiments allows for an electric machine capable of generating more power than conventional machines. The higher thermal transfer of the embodiments described herein result in a stator assembly which can be used in higher thermal class applications due the improved ability to dissipate heat away from the stator windings. Thus, another advantage of the above described embodiments is that electric machines having the described generator assembly may be driven to generate more power and at higher temperatures than the conventional electric machines.

In even yet another advantage of the above-described embodiments is that by providing improved heat dissipation of the stator windings, and thus allowing the windings to operate at a lower temperature, which may require less maintenance and a higher mean time between failures, the overall operating life of the generator is improved, and/or the maintenance time and costs of the generator are reduced. When designing electric machine systems, an important factor to address is reliability. Improved operating life, and reduced maintenance time and costs result in competitive advantages.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator assembly for an electric machine comprising:
    a stator core having multiple posts;
    multiple windings, with a winding provided on each of the posts;
    a stator sleeve located about the stator core and an inner surface confronting the windings and comprising:
        a convection reservoir extending along and in a thermally conductive confronting relationship with at least a portion of the windings,
        a delivery reservoir extending along at least a portion of the length of the convection, and
        a plurality of transfer ports fluidly coupling the convection reservoir with the delivery reservoir; and
    a thermally conductive sleeve defining the inner surface and confronting the stator core, and defining a second surface, spaced from the inner surface, confronting the stator sleeve, and defining at least a portion of the convection reservoir;
    wherein the convection reservoir is located between the delivery reservoir and the inner surface, and the delivery reservoir has an inlet and the convection reservoir has an outlet to define a coolant flow path, whereby coolant can be provided to the inlet where it flows through the delivery reservoir, through the plurality of transfer ports to the convection reservoir, and out the outlet.

2. The stator assembly of claim 1 wherein the convection reservoir is in a thermal conductive relationship with at least one of the stator core or the windings, whereby coolant moving through the coolant flow path conducts heat generated by the windings away from the at least one of the stator core or the windings.

3. The stator assembly of claim 1 wherein the at least one transfer port further comprises at least one impingement port, whereby coolant moving through the at least one impingement port provides for the removal of heat generated by the windings via impingement cooling.

4. The stator assembly of claim 1 wherein the convection reservoir is in a thermal relationship with at least one of the stator core, the windings, or the thermally conductive sleeve, whereby coolant moving through the coolant flow path conducts heat generated by the windings away from the at least one of the stator core, the windings, or the thermally conductive sleeve.

5. The stator assembly of claim 1 wherein the stator sleeve further comprises an inner stator sleeve and an outer stator sleeve.

6. The stator assembly of claim 5 wherein the inner stator sleeve is radially defined by a third surface and a fourth surface spaced from the third surface, wherein the third surface confronts the second surface and defines at least another portion of the convection reservoir, and wherein the fourth surface confronts the outer stator sleeve and defines at least a portion of the delivery reservoir.

7. The stator assembly of claim 6 wherein the outer stator sleeve is radially defined by at least a fifth surface confronting the fourth surface and defining at least a portion of the delivery reservoir.

8. The stator assembly of claim 1 wherein the stator sleeve further comprises an inner stator sleeve and an outer stator sleeve.

9. The stator assembly of claim 8 wherein the inner stator sleeve is radially defined by a second surface and a third surface, spaced from the second surface, wherein the second surface confronts the inner surface and defines at least a portion of the convection reservoir, and wherein the third surface confronts the outer stator sleeve and defines at least a portion of the delivery reservoir.

10. The stator assembly of claim 9 wherein the outer stator sleeve is radially defined by at least a fourth surface confronting the third surface and defining at least a portion of the delivery reservoir.

11. The stator assembly of claim 1 wherein a plurality of transfer ports aligned axially along the length of the stator sleeve define a row of transfer ports.

12. The stator assembly of claim 11 wherein at least one row of transfer ports corresponds to at least one convection reservoir and at least one delivery reservoir.

13. The stator assembly of claim 11 wherein the transfer ports are arranged such that transfer ports of adjacent rows are staggered along the length of the stator sleeve.

14. The stator assembly of claim 1 wherein a cross-sectional area of the transfer ports, relative to the volume of delivery reservoir, is configured such that the delivery reservoir, subject to a given supply rate of coolant, is operably capable of distributing the coolant to all of the transfer ports.

15. A stator assembly for an electric machine comprising:
a stator core having multiple posts;
multiple windings, with a winding provided on each of the posts; and
a stator sleeve located about the stator core and an inner surface confronting the windings and comprising:
a convection reservoir extending along and in a thermally conductive confronting relationship with at least a portion of the windings,
a delivery reservoir extending along at least a portion of the length of the convection reservoir,
a plurality of transfer ports fluidly coupling the convection reservoir with the delivery reservoir, and
an inner stator sleeve and an outer stator sleeve, wherein the inner stator sleeve is radially defined by a second surface and a third surface, spaced from the second surface, wherein the second surface confronts the inner surface and defines at least a portion of the convection reservoir, and wherein the third surface confronts the outer stator sleeve and defines at least a portion of the delivery reservoir;
wherein the convection reservoir is located between the delivery reservoir and the inner surface, and the delivery reservoir has an inlet and the convection reservoir has an outlet to define a coolant flow path, whereby coolant can be provided to the inlet where it flows through the delivery reservoir, through the plurality of transfer ports to the convection reservoir, and out the outlet.

16. The stator assembly of claim 15, wherein the convection reservoir is in a thermal conductive relationship with at least one of the stator core or the windings, whereby coolant moving through the coolant flow path conducts heat generated by the windings away from the at least one of the stator core or the windings.

17. The stator assembly of claim 15, wherein the at least one transfer port further comprises at least one impingement port, whereby coolant moving through the at least one impingement port provides for the removal of heat generated by the windings via impingement cooling.

18. The stator assembly of claim 15, wherein the outer stator sleeve is radially defined by at least a fourth surface confronting the third surface and defining at least a portion of the delivery reservoir.

19. The stator assembly of claim 15, further comprising a thermally conductive sleeve defining the inner surface and confronting the stator core, and defining a second surface, spaced from the inner surface, confronting the stator sleeve, and defining at least a portion of the convection reservoir.

20. The stator assembly of claim 19, wherein the convection reservoir is in a thermal relationship with at least one of the stator core, the windings, or the thermally conductive sleeve, whereby coolant moving through the coolant flow path conducts heat generated by the windings away from the at least one of the stator core, the windings, or the thermally conductive sleeve.

* * * * *